Figure 1:
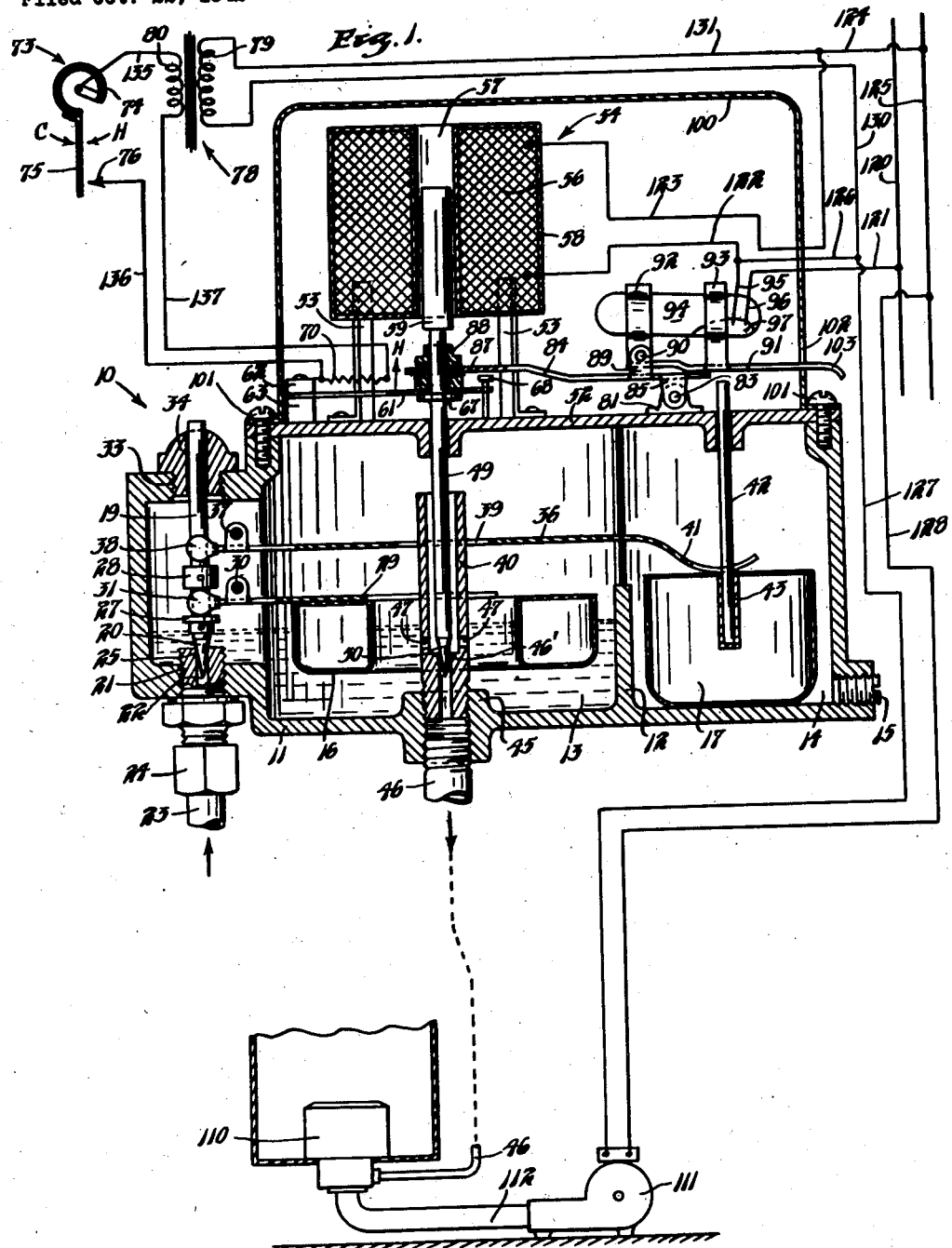

Dec. 14, 1948. A. C. BENNETT 2,456,170
LIQUID FUEL BURNER CONTROL
Filed Oct. 22, 1942 2 Sheets—Sheet 1

Inventor
ASHLEY C. BENNETT
By George H. Fisher
Attorney

Dec. 14, 1948.  A. C. BENNETT  2,456,170
LIQUID FUEL BURNER CONTROL
Filed Oct. 22, 1942  2 Sheets-Sheet 2
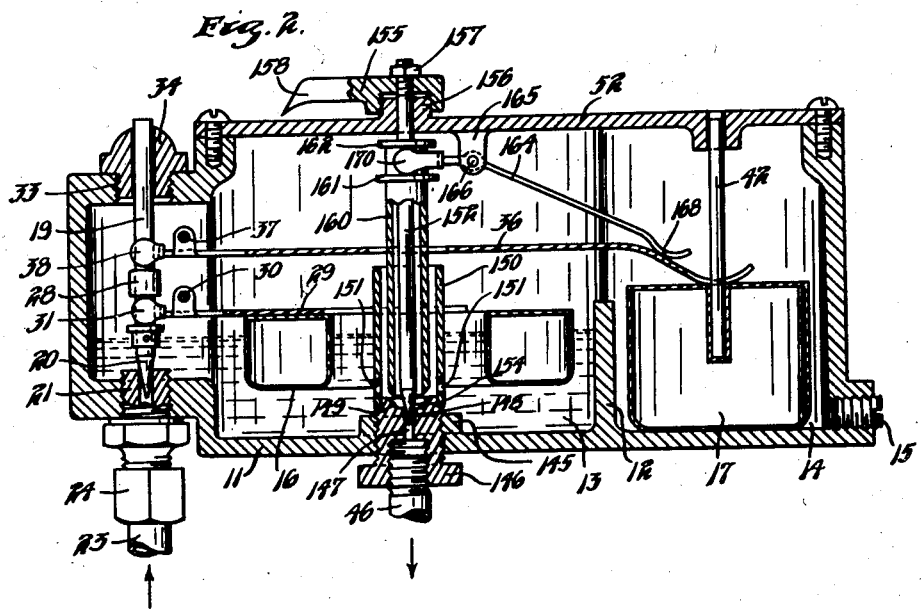
Inventor
ASHLEY C. BENNETT.
George H Fisher
Attorney Patented Dec. 14, 1948

2,456,170

UNITED STATES PATENT OFFICE 2,456,170

LIQUID FUEL BURNER CONTROL

Ashley C. Bennett, St. Louis Park, Minn.

Application October 22, 1942, Serial No. 462,947

18 Claims. (Cl. 158—42.3)

1

The present invention is concerned with a liquid level control and more particularly with one designed for the control of the flow of fuel oil to a burner.

An object of the present invention is to provide a liquid level control in which adequate provision is made for interrupting the flow of liquid upon the level of the liquid in a liquid chamber of the control rising to an abnormal level.

More specifically, an object of the present invention is to provide a liquid level control in which there are two valve means, one of which is normally positioned so as to maintain a constant level of liquid in the control and the other of which is positioned in accordance with the demand for liquid, and both of which are closed upon the liquid in the control assuming an abnormal level.

A still further object of the present invention is to provide a valve mechanism in which any tendency of the valve to clog is eliminated by constantly vibrating a valve element.

More specifically, it is an object of the present invention to provide a valve mechanism in which the tendency of the valve to clog when in a minimum open position is avoided by providing an alternating current energized electromagnetic operator which is effective to vibrate the valve with a frequency equivalent to the frequency of the energizing alternating current.

A still further object of the invention is to provide an arrangement such as set forth previously in which the position of the valve which is vibrated is controlled by a condition responsive means.

A still further object of the invention is to provide a valve mechanism of the type in which the valve is vibrated by an electromagnetic operator, in which the movement of the valve by the electromagnetic operator is opposed by a resilient temperature responsive element which is heated under certain conditions so as to move in such a manner as to permit the valve to move to full open position.

A still further object of the invention is to provide an arrangement employing an electromagnetic operator for vibrating a valve to prevent clogging in which means is provided which is effective upon the liquid in the valve mechanism rising to an abnormal level to interrupt the energizing circuit of the electromagnetic operator to cause closure of the valve.

A still further object of the invention is to provide an arrangement in which there are two valve elements cooperable with a valve seat, one of these

2 valve elements being positioned in accordance with the demand for liquid and the other of the valve elements being engaged with the seat upon the liquid level within the control rising abnormally.

A still further object of the invention is to provide a valve mechanism for a fluid fuel burner in which a valve means is normally positioned in either a minimum flow or full open position depending upon the value of a controlling condition and in which upon the fuel within a liquid chamber of the valve mechanism rising to an abnormal level, the valve means is closed completely and is prevented from initially reopening beyond the minimum flow position.

A still further object of the invention is to provide in combination with a fluid fuel burner having an electrically operated draft controlling means, a valve mechanism in which upon the liquid fuel therein rising to an abnormal level, a valve means normally adjusted in accordance with the demand for fuel is completely closed and the draft controlling means is deenergized.

Still other objects of the invention will be apparent from a consideration of the accompanying specification, claims, and drawing, of which Figure 1 is a view of a burner control mechanism embodying my improved liquid level control, the liquid level control being shown in section and the various other elements of the burner control mechanism in schematic form and in which Figure 2 is a modified form of my liquid level control.

Referring to the drawings for a more detailed understanding of the invention, my liquid level control is generally indicated by the reference numeral 10. This control comprises casing member 11 which is separated by a partition 12 into a normal float chamber 13 and an overflow float chamber 14. Communicating with the bottom of the overflow chamber 14 is an aperture which is normally closed by a threaded closure plug 15. This plug can be removed whenever it is desired to drain chamber 14.

A float 16 is located in the float chamber 13 and a float 17 in the overflow float chamber 14. Both floats 16 and 17 may be of any suitable construction and are shown for purposes of illustration in the drawing as hollow metal floats. The float 16 is annular in form. Both floats 16 and 17 control the position of a valve stem 19 which is tapered at its lower end, as indicated by the reference numeral 20, to form a valve head adapted to cooperate with a valve seat 25 formed on a nipple member 21 threadedly secured in the bottom of the valve casing 11. The nipple member 21 has an aperture 22 extending therethrough. Connected to the outer end of the nipple 21 by a coupling nut 24 is a pipe 23. The valve formed by the cooperating valve head 20 and valve seat 25 constitutes the inlet valve of the liquid level mechanism. The pipe 23 serves to supply liquid to the mechanism and leads from any suitable source of liquid (not shown). Secured to the valve stem 19 are a pair of spaced collars 27 and 28. The float 16 is secured to a lever 29 which is pivotally secured to the valve casing by a pivot pin 30. The left hand end of lever 29 is in the form of a yoke 31 which straddles the valve stem 19 between the two collars 27 and 28. By reason of the yoke 31 positioned between the two collars 27 and 28, the pivot 29 is, in effect, pivotally connected to valve stem 19. It will be obvious that as the liquid level within the chamber 13 rises and falls, the float 16 will be effective to move valve member 20. As the liquid level rises, the valve head 20 is moved into engagement with the valve seat 25 of nipple 21 to shut off the flow of liquid into chamber 13.

The casing 11 is provided with an aperture 33 into which is screwed an apertured closure plug 34. The upper end of valve stem 19 extends through the aperture of closure plug 34. The closure plug 34 serves to guide the upper end of valve stem 19. Moreover, because of the fact that valve stem 19 extends through to a point above the top of closure plug 34, it is possible to manually operate valve 20 by pushing down or raising up the end of valve stem 19.

As previously noted, the float 17 is also designed to actuate valve stem 19. This actuation is effected by a lever 36 which is pivotally secured to the casing by a pivot pin 37. As with the lever 29, the left hand end of lever 36 is formed in the form of a yoke 38 which straddles the valve stem 19 and which is designed under certain conditions to engage the collar 28. The lever 36 is provided with an annular portion 39 which surrounds a threaded valve guiding sleeve 40 to be presently described. The right hand end of lever 36 terminates in a curved bifurcated end 41 which bears against the float 17. The bifurcated curved end 41 of lever 36 straddles a rod 42 disposed in a cylindrical recess of the float 43. As will be obvious, upon the liquid rising in the overflow float chamber 14, the float 17 will rise to rock lever 36 in a counter-clockwise direction and to raise rod 42. The rocking of lever 36 in a counter-clockwise direction will cause the yoke 38 to bear against collar 28 and to move valve member 20 firmly into engagement with the valve seat 25.

The valve guiding sleeve 40 previously referred to is threadedly secured at its lower end in an apertured boss 45 formed on the bottom of the casing. This boss 45 is provided with a threaded opening therethrough to which is secured an outlet pipe 46 leading to the apparatus. The bore of the sleeve 40 is reduced near the lower end of the sleeve to form a valve seat 46'. The sleeve 40 is further provided with a plurality of apertures 47 which communicate with the interior of sleeve 40 and with the valve seat 46. Cooperating with the valve seat 46' is a valve stem 49 tapered at its lower end to form a valve head 50. Both the rod 49 just discussed and the rod 42 are slidably supported adjacent their upper ends by a cover plate 52, the rods 49 and 42 extending through apertures in this cover plate.

Supported on the cover plate 52 by a plurality of standards 53 is a solenoid 54. This solenoid comprises an electromagnetic winding 56 having a central aperture therethrough in which is disposed a coil lining sleeve 57 of brass or some other non-magnetic material. Surrounding the top, bottom, and outer surfaces of coil 56 is a casing member 58 of iron or other suitable magnetic material. Slidably disposed within the non-magnetic sleeve 57 is a core 59 of magnetic material. Core 59 is secured to valve stem 49. As is conventional with solenoids, upon energization of the winding 56, the core 59 is drawn up in an attempt to reduce the reluctance of the flux path including core 59. The core 59 thus serves to position the valve stem 49 and hence valve head 50 with respect to the valve seat 46.

A bimetallic element 61 is secured at its left hand end between two blocks 62 and 63 of insulating material which are clamped together against the bimetallic element and to the cover plate 52 by any suitable fastening means. As indicated by the arrow adjacent the right hand end of bimetallic element 61, this element is designed to warp upwardly upon heating. The right hand portion of element 61 is provided with an aperture through which extends the valve stem 49. The valve stem 49 is provided with a collar 67 which abuts the bimetallic element 61. It will be obvious that upon the winding 56 being energized so as to move the valve head 50 away from valve seat 46, the bimetallic element, when in the position shown in the drawing, will tend to resist such movement.

Associated with the bimetallic element 61 is an electrical heating element 70. This electrical heating element is disposed sufficiently close to the bimetallic element so that upon energization of the heating element, it serves to raise the temperature of bimetallic element 61 and cause the right hand end thereof to move upwardly. This upward movement of the right hand end of bimetallic element is limited by a stop pin 68.

The energization of heater element 70 is controlled by a switch responsive to some controlling condition indicative of the demand for burner operation. In the specific embodiment of the invention shown, this switch is in the form of a conventional room thermostat 73. This thermostat comprises a bimetallic element 74 to which is secured a contact arm 75 movable into and out of engagement with a fixed contact 76. As indicated by the legends C and H adjacent the contact arm 75, the bimetallic element 74 is so disposed that the contact arm 74 is moved to the right upon a drop in temperature and to the left upon a rise in temperature. Power for energization of the heater 70 is obtained from a step down transformer 78. This step down transformer comprises a line voltage primary 79 and a low voltage secondary 80.

Secured to the top of cover plate 52 is a bracket 81 carrying a pivot pin 83. Secured to pivot pin 83 is a lever 84 which has two downturned ears 85 straddling the bracket 81 and journalled about pivot pin 83. The left hand end 87 of lever 84 is bifurcated and the two legs of the bifurcated portion 87 straddle a flanged collar 88 slidably secured on the valve stem 49. The two legs of bifurcated portion 87 extend between the flanges of collar 88 so that upon movement of collar 88, the lever 84 is tilted. The lever 84 is provided with two upturned ears 89. A pivot pin 90 extends between these upturned ears 89 and pivotally supports a switch carrying lever 91. The switch carrying lever 91 is provided with a pair of clips 92 and 93 which support a mercury switch 94. Mercury switch 94 is of conventional construction comprising a pair of electrodes 95 and 96 which are adapted to be bridged by a globule 97 of mercury. The mechanism described as supported by cover plate 52 is enclosed by a housing member 100. Screws 101 or other suitable fastening means are employed to secure the housing member 100 and the cover plate 52 in position on the upper edge of the casing 11. The housing member 100 is provided with an aperture 102 extending through the right hand portion thereof. The right hand end of lever 91 extends through this opening 102 and terminates in a finger piece 103 designed to be grasped by the operator for manual manipulation of lever 91.

My liquid level control mechanism is shown as controlling the flow of oil to a gravity feed type of oil burner indicated by the reference numeral 110. This burner is of conventional construction and is shown only schematically. Associated with the burner 110 is a blower 111 which serves to provide a forced draft to burner 110 through the conduit 112. It is to be understood that the liquid level control mechanism 10 is shown on a much larger scale than the burner mechanism 110. Actually, the valve mechanism 10 is smaller than the burner 110 and is on substantially the same level or slightly above the burner. The pipe 23 communicates with an oil storage tank.

Operation of species of Figure 1

The various elements are shown in the drawing in the position they assume when the burner is operating under low fire conditions. It will be noted that the contact arm 75 is separated from contact 76, this being the position that contact arm 74 assumes when the temperature adjacent thermostat 73 is at or is above the desired value. In other words, the thermostat is "satisfied" so that heater 70 is not energized.

Under these conditions, the solenoid winding 56 is energized by a circuit as follows: from a line wire 120 through conductor 121, mercury switch 94, conductor 122, winding 56, and conductors 123 and 124 to another line wire 125. The line wires 120 and 125 lead to any suitable source of alternating power (not shown).

The energization of electromagnetic winding 56 tends to move valve head 50 upwardly. Due to the fact, however, that the heater 70 is not energized, because of thermostat 73 being satisfied, the bimetallic element 61 tends to assume its cold position in which the bimetallic element engages collar 67 and impedes upward movement of valve stem 49. The bimetallic element 61 thus acts as a stop to prevent the valve 50 from moving to full open position. Due to the resiliency, however, of the bimetallic element 61, the bimetallic element 61 acts as a resilient stop. It will be noted from the preceding description of the solenoid 54 that no means is provided to overcome the normal tendency of a solenoid energized by alternating current to exert a vibrating force. In an ordinary solenoid energized by alternating current, there is a tendency for the magnetic pull on the solenoid core to vary with the frequency of the energizing alternating current. In many applications of such solenoids, this tendency is avoided as much as possible by the use of shading. In the present application, the shading is deliberately omitted so that the solenoid core 59 tends to vibrate up and down. As the solenoid pull is increasing, the movement of valve head 50 in opening direction will be yieldably retarded by the element 61. When the solenoid pull is decreasing, the element 61 will tend to move the valve head 50 toward closed position. Since, except for the instant in each cycle that the energizing current is at its zero value, the solenoid is always exerting some pull, the collar 67 will always be in engagement with the resilient element 61 so that the element 61 will at all times affect the position of valve head 50. Thus, the valve when in its partially open position, will vibrate about a position determined by the position of element 61. This is a very important feature of my invention in that it eliminates any tendency of the valve orifice to clog. Where an attempt is made to throttle down the flow of oil beyond a predetermined minimum, considerable difficulty is usually experienced with clogging of the valve passages. As a result, it has been impossible to throttle the flow of oil beyond a certain fairly large amount. With the present arrangement, it is possible to maintain the valve in a partially open position in which the average area of the opening between the valve head and the valve seat is only a small fraction of the area of the valve orifice. This partially open position is determined by the position of the bimetallic element 61 and the resiliency of this element. In the drawing, the valve opening has been exaggerated considerably to clarify the illustration.

It will be noted that the circuit to the winding 56 includes the mercury switch 94. The mercury switch 94 is held in closed position, as long as winding 56 is energized and bimetallic element 61 is thus vibrated in its flexed or intermediate range of positions, through the cooperative action of levers 84 and 91. The lever 84 is tilted slightly upward by the action of flanged collar 68 which rests on the bimetallic element 61. The lever 91 is biased in a clockwise direction by the weight of the switch 94 so as to engage the right hand end of lever 84 and assume a position determined by lever 84.

The switch 94 also controls the energization of the blower 111, the circuit to the blower being as follows: from line wire 120 through conductor 121, mercury switch 94, conductors 126 and 127, blower 111, and conductor 128 to the other line wire 125. The operation of blower 111 serves to supply draft air to the burner 110 to insure proper combustion of the oil being fed to burner 110.

The primary 79 of transformer 78 is also energized by reason of the closure of switch 94, the circuit being as follows: from line wire 120 through conductor 121, mercury switch 94, conductors 126 and 130, primary winding 79 and conductors 131 and 124 to the other line wire 125. Despite the energization of primary winding 79 and the resultant energization of secondary 80, the heater 70 is not energized, as previously explained, due to the fact that thermostat 73 is satisfied.

The oil is maintained within the chamber 13 at the level indicated in the drawing. Whenever the oil drops below this level, the float 16 is lowered to raise valve head 20 with respect to the valve seat 25 to admit more oil into the chamber 13. There is thus a constant head of oil which maintains a constant flow of oil through pipe 46 to burner 110.

Now let it be assumed that thermostat 73 calls for heat; that is, that the temperature drops sufficiently to cause engagement of contact arm 75 with contact 76. When this happens, a circuit is established to electrical heater 70 as follows: from the upper terminal of secondary 80 through conductor 135, bimetallic element 74, contact arm 75, contact 76, conductor 136, electrical heater 70, and conductor 137 to the other terminal of secondary 80. The resultant energization of heater 70 causes the bimetallic element 61 to warp upwardly until the right hand end thereof engages the head of stop pin 68. The movement of bimetallic element 61 upwardly permits the solenoid 59 to move valve 50 to open position. In this full open position, the vibration of the valve will be considerably less since bimetallic element 61 is engaged with stop 68 so that the solenoid core 59 is, in effect, acting against a relatively fixed stop, with the result that the only force tending to move the valve downwardly is that of gravity. There is no need for vibration of the valve, however, when the valve is in full open position since there is no danger of the valve opening clogging under these circumstances.

The movement of valve 50 to its full open position causes the supply of oil to burner 110 to be increased so that the burner 110 is operating at its maximum capacity. This will eventually result in the heating of the medium with which thermostat 73 is associated so that contact arm 74 will separate from contact 76. Upon this happening, the bimetallic element 61 will cool off and will be effective to force valve 50 downwardly to its minimum flow position. It will thus be seen that during normal operation, the valve 50 assumes either a minimum flow position in which it is vibrated by the solenoid 54 or a full open position in which it is relatively stationary. The movement of the valve between its two positions is controlled by the thermostat 73.

As indicated previously, the float 16 is normally effective to position the valve head 20 so as to maintain the oil at a constant level in chamber 13. It occasionally happens, however, that a float such as float 16 may become ruptured so that it no longer floats. Or, a particle of dirt may become lodged between valve head 20 and the seat 25. In either case, the valve 20 is not effective to cut off the flow of fuel into the chamber 13. If some means were not provided to cut off the flow of fuel, the oil would eventually rise to the point where the oil actually flowed out through the top cover plate 52 and on to the floor of the space in which the heater is located. The float 17 is provided for the purpose of avoiding this possibility. Upon the level of the oil in chamber 13 rising above the height of wall 12, the oil will flow into chamber 14 to raise float 17. When float 17 rises, it rocks the lever 36 to apply additional closing force to valve head 20. Because of the high mechanical advantage of the lever 36, the closing force applied to valve head 20 by float 17 is quite substantial. Obviously, if the failure of valve 20 to close was due simply to a defective condition of float 16, the operation of float 17 will cause closure of valve 20. However, even if the failure of valve 20 to close is due to some foreign matter lodged between the valve head and the valve seat, the probability is that because of the additional closing force applied by float 17, the valve 20 will be effectively closed.

Not only does the float 17 function to apply additional closing force to inlet valve 20 but it also functions to cause closure of valve head 50 and to interrupt operation of the apparatus until someone has had an opportunity to inspect the cause of the failure and to manually reset the system. Upon float 17 rising, the rod 42 will likewise rise, as previously explained. Upon rod 42 rising, it will tip the switch carrying arm 91 and cause switch 94 to move to open position. The opening of switch 94 causes deenergization of the blower motor 111, the solenoid 56, and the primary 79. The deenergization of solenoid 56 causes valve 50 to move to closed position and thus to terminate the feeding of oil to the burner 110. The burner is thus completely shut down due to the fact that it is supplied with neither oil nor draft air. The deenergization of primary winding 79 assures the deenergization of heater 70 so that when the apparatus is again started up, the burner will initially be supplied with a minimum amount of fuel.

The dropping of solenoid core 59 lowers the left hand end of lever 84 so that even if the oil level in the overflow chamber 14 drops, switch 94 will remain in open position. It will be recalled that the maintenance of switch 94 in closed position depended upon the energization of solenoid 56. Thus, as soon as solenoid 56 becomes deenergized, switch 94 remains in open position independently of the action of float 17. In order to restart the apparatus, it is necessary for the operator to push down on finger piece 103 and tilt the lever 91 in a clockwise direction. This involves the tilting of lever 84 which is possible because of the fact that collar 88 slides on the stem 49. As soon as the switch 94 is tilted to closed position, the original energizing circuit to solenoid 56 is reestablished so that the solenoid core 59 moves to a position in which it is able to hold switch 94 in closed position.

It will thus be seen that whenever float 17 is raised due to the liquid flowing into overflow chamber 14, both valve heads 20 and 50 are engaged with their seats and the entire system is shut down until the operator is able to manually reset the system. This gives an operator a chance to inspect the device to determine the cause of the difficulty and prevents continued operation of the valve when the mechanism including float 16 and valve 20 is not operating properly.

It will be seen that in the embodiment of Figure 1, I have provided a valve which is extremely trouble free. In the first place, provision is made for maintaining a minimum flow of oil without clogging of the valve. Provision is also made for increasing this flow of oil to a value adequate to take care of any heating requirements. Furthermore, while the apparatus functions normally to maintain a constant level of oil in the liquid chamber, provision is made in the event of this oil rising above a desired level to not only shut off the inlet valve but also to shut off the metering valve and to shut down the system until some manual attention has been given the device.

Species of Figure 2

The arrangement of Figure 2 is similar in many respects to that of Figure 1. A principal difference between the arrangement of Figure 2 and that of Figure 1 is that the metering valve is provided merely with a manual adjustment and that the float in the overflow chamber operates an auxiliary valve associated with the metering valve rather than the metering valve itself. In order to facilitate a comparison of the species of Figures 1 and 2, the same reference characters are employed in describing parts in Figure 2 which are identical or substantially equivalent to elements of the embodiment of Figure 1.

In this embodiment of the invention, the casing 11 is provided with a boss 145 into which is threaded an apertured plug 146. Secured to this plug 146 is the pipe 46 which leads to the oil burner. The plug 146 is provided with an aperture 147 which terminates at its upper end in a valve seat 148. Surrounding this valve seat 148 is a second valve seat 149, the two valve seats 148 and 149 in effect constituting a single valve seat. Secured to the upper end of the plug 146 is a sleeve 150 which is provided adjacent its lower portion with apertures 151 to permit oil to flow within the sleeve 150.

A rod 152 terminates at its lower end in a tapered valve head 154 which cooperates with the valve seat 148. This valve stem 152 extends at its upper end through an apertured boss 156. The upper end of the rod is threadedly secured to a handle member 155 and held against turning with respect thereto by a nut 157. The handle member 155 is threadedly secured to boss 156 so that upon rotation of handle member 155, its vertical position and consequently the vertical position of rod 152 is changed. The outer end of handle member 155 is provided with a pointer 158 which cooperates with any suitable scale (not shown) to indicate the setting of valve stem 152 and valve head 154. The valve head 154 corresponds to valve 50 of the species of Figure 1 and acts as a metering valve for the liquid level control. In this species, however, the position of this valve is manually controlled instead of automatically. It is to be understood that as far as certain features of Figure 2 are concerned, the stem 154 could be automatically controlled in the same manner as in Figure 1.

Surrounding and concentric with the valve stem 152 is a tubular valve member 160. This valve member is beveled at its lower end to cooperate with the inclined valve seat 149. Adjacent its upper end the tubular valve member 160 is provided with a pair of flanges 161 and 162. A lever 164 is journalled on a pivot pin 166 supported by a pair of ears 165 projecting downwardly from the cover plate 52. The right hand end of lever 64 is provided with a curved portion 168 which bears against the lever 36 so as to be raised by float 17 whenever lever 36 is raised by float 17. The left hand end of lever 164 is provided with a yoke 170 which straddles the tube 160 between the two flanges 161 and 162.

It will be obvious that whenever lever 164 is tilted by reason of float 17 rising, the valve tube 160 is moved downwardly into engagement with the valve seat 149.

It is believed that the operation of Figure 2 is fairly clear from the foregoing description. Under normal circumstances, the liquid is maintained at a constant level within chamber 13 by the cooperative action of float 16 and valve 20. The flow of oil to the oil burner is controlled by the metering valve 154, the position of this valve being controlled by the adjustment of handle 155. If at any time, the float 16 and valve 20 fail to operate properly so that the oil level rises above the height of the partition 12, the float 17 is raised to rock levers 36 and 164 in a counterclockwise direction. The effect of this movement of lever 36 is identically the same as in Figure 1. In other words, additional closing pressure is applied to valve 20. The lever 164 is effective to move the valve tube 160 into engagement with its valve seat. As soon as this valve engages its valve seat it is impossible for oil to flow out through tube 46 until such time as the oil level rises above the height of tube 160. This is not likely to occur due to the fact that the additional closing pressure applied by valve 20 is usually effective to cut off all flow of oil into the chamber 13 or, in extreme cases, to reduce this flow to an almost negligible value. It will thus be seen that as in Figure 1, provision is made for closing both the inlet and metering valves upon the liquid rising to an abnormal level. In this case, this is done by providing the metering valve means with two independently movable valve members which cooperate with what amounts to substantially the same valve seat. One of these valve members is adjusted for metering purposes while the other valve member is actuated to terminate the flow of oil upon the existence of abnormal conditions.

While I have shown certain specific embodiments of my invention, it is to be understood that this is for purposes of illustration only and that my invention is to be limited solely by the scope of the appended claims.

I claim as my invention:

1. In a liquid fuel control for a burner, a casing having a first float chamber, and an overflow float chamber into which liquid flows only when the liquid fuel in said first float chamber rises to an abnormal level, floats in said first float chamber and said overflow float chamber, a first valve means positioned by the float in said first float chamber, a second valve means in series with said first valve means, thermostatically affected means for adjusting the position of said second valve means in accordance with the demand for liquid and continually vibrating the same when said valve means is in an intermediate position, and operative connections between the float in said overflow float chamber and both said first valve means and said second valve means such that upon the liquid fuel rising in said overflow float chamber, both valve means are closed.

2. In a valve structure, a casing having a float chamber, a float in said chamber and operative to rise from a normal position upon an abnormal rise in the level of the liquid in said chamber, a valve, an electromagnetic operator operatively connected to said valve and tending when energized to open said valve, a stop for opposing the opening movement of said valve beyond a partially open position, means for moving said stop to a position in which said electromagnetic operator is free to move said valve to full open position, and switching means operated by said float and effective upon said float rising to deenergize said electromagnetic operator so as to cause said valve to close.

3. In a valve structure, a casing having a liquid chamber, a valve, an alternating current energized electromagnetic operator operatively connected to said valve and tending when energized to open said valve, a resilient stop for opposing the opening movement of said valve beyond a partially open position, said electromagnetic operator being operative when said resilient stop is opposing the opening of the valve to vibrate said valve with a frequency dependent upon the frequency of the alternating current, and switching means operated upon the liquid rising to an abnormal level in said liquid chamber to deenergize said electromagnetic operator so as to cause said valve to close.

4. In a valve structure, a casing having a liquid chamber, a valve, an alternating current energized electromagnetic operator operatively connected to said valve and tending when energized to open said valve, a resilient stop for opposing the opening movement of said valve beyond a partially open position, said electromagnetic operator being operative when said resilient stop is opposing the opening of the valve to vibrate said valve with a frequency dependent upon the frequency of the alternating current, means for moving said resilient stop to a position in which said electromagnetic operator is free to move said valve to full open position, and means operated upon the liquid rising to an abnormal level in said liquid chamber to cause said valve to close.

5. In a valve structure, a casing having a float chamber, a float in said chamber and operative to rise from a normal position upon an abnormal rise in the level of the liquid in said chamber, a valve, an alternating current energized electromagnetic operator operatively connected to said valve and tending when energized to open said valve, a resilient stop for opposing the opening movement of said valve beyond a partially open position, said electromagnetic operator being operative when said resilient stop is opposing the opening of the valve to vibrate said valve with a frequency dependent upon the frequency of the alternating current, means for moving said resilient stop to a position in which said electromagnetic operator is free to move said valve to full open position, and switching means operated by said float and effective upon said float rising to deenergize said electromagnetic operator so as to cause said valve to close.

6. In a valve structure, a valve, an alternating current operated electromagnetic operator connected to said valve, a resilient temperature responsive element for opposing the opening movement of said valve beyond a partially open position, said electromagnetic operator being effective when said temperature responsive element is opposing the opening of the valve to vibrate said valve with a frequency dependent upon the frequency of the alternating current, and temperature changing means for changing the temperature of the temperature responsive element to cause it to vary the position to which said electromagnetic operator is free to move said valve.

7. In a valve structure, a valve, an alternating current operated electromagnetic operator connected to said valve, a resilient bimetallic element for opposing the opening movement of said valve beyond a partially open position, said electromagnetic operator being effective when said bimetallic element is opposing the opening of the valve to vibrate said valve with a frequency dependent upon the frequency of the alternating current and to an extent dependent upon the resiliency of said bimetallic element, and a heater for heating the bimetallic element to vary the position to which said electromagnetic operator is free to move said valve.

8. In a valve structure, a valve, an alternating current operated electromagnetic operator connected to said valve, a resilient stop for opposing the opening movement of said valve beyond a partially open position, said electromagnetic operator being operative when said resilient stop is opposing the opening of the valve to vibrate said valve with a frequency dependent upon the frequency of the alternating current, and means for moving said resilient stop to a position in which said electromagnetic operator is free to move said valve to full open position.

9. In a valve structure, a valve member, a valve seat having an opening therethrough which is closed by said valve member when the latter is engaging said seat, an alternating current operated electromagnetic operator connected to said valve member, and resilient means for opposing the opening movement of said valve member beyond a partially open position, said partially open position being one in which the area of the opening between the valve member and its seat is substantially less than the opening through the valve seat, and said electromagnetic operator being operative when said resilient stop is opposing the opening of the valve to vibrate said valve with a frequency dependent upon the frequency of the alternating current.

10. In a valve structure for controlling the flow of a conditioning fluid, a valve member, a valve seat having an opening therethrough which is closed by said valve member when the latter is engaging said seat, means affected by an element responsive to a controlling condition indicative of the demand for said conditioning fluid for positioning said valve member and, when said condition assumes a predetermined value, for longitudinally vibrating said valve element in a partially open position in which the area of the opening between the valve member and its seat is substantially less than the opening through the valve seat.

11. In a liquid level control, a casing having a first float chamber, and an overflow float chamber into which liquid flows only when the liquid in said first float chamber rises to an abnormal level, floats in said first float chamber and said overflow float chamber, a first valve means, positioned by the float in said first float chamber, a second valve means in series with said first valve means and comprising a valve seat and two independently movable valve elements adapted to independently engage said seat, means for adjusting the position of one of said movable valve members of said second valve means in accordance with the demand for liquid, and operative connections between the float in said overflow float chamber and both said first valve means and the other movable member of said second valve means such that upon the liquid rising in said overflow float chamber, both valve means are closed.

12. In a liquid level control, a casing having a liquid chamber, a valve means comprising two concentric movable valve members adapted to independently engage said seat, means for rigidly adjusting one of said valve members in accordance with the demand for liquid, and means for causing said other valve member to engage said seat without movement of said adjusting means whenever the liquid in said chamber rises to an abnormal value.

13. In a liquid level control, a casing having a first float chamber and an overflow float chamber into which liquid flows only when the liquid in said first float chamber rises to an abnormal level, floats in said first float chamber and said overflow float chamber, a first valve means, means for positioning said first valve means by the float in said first float chamber, second valve means comprising two concentric movable valve members independently engaging said seat, means for adjusting one of said valve members of said second valve means in accordance with the demand for liquid, and means for positioning the other of said valve members without movement of said adjusting means by the float in said overflow chamber.

14. In a valve mechanism, a liquid chamber, means for normally maintaining fluid fuel in said chamber at a constant level, valve means for controlling the flow of fuel from said chamber, means controlled by a device responsive to a controlling condition for automatically moving said valve means between a minimum flow position and a full open position depending upon the value of said condition, means operative upon the fuel rising in said chamber to an abnormal level to cause said valve means to close completely and to prevent said valve means from initially reopening beyond said minimum flow position.

15. In combination with a fluid fuel burner having an electrically operated draft controlling means, a valve mechanism for controlling the flow of fuel to said burner and comprising a liquid chamber, means for normally maintaining fluid fuel in said chamber at a constant level, valve means for controlling the flow of fuel from said chamber to said burner, means for adjusting said valve means in accordance with the demand for fuel, and means operative upon the fuel rising in said chamber to an abnormal level to cause said valve means to close completely and cause deenergization of said draft controlling means.

16. In combination with a fluid fuel burner having an electrically operated draft controlling means, a valve mechanism for controlling the flow of fuel to said burner and comprising a liquid chamber, means for normally maintaining fluid fuel in said chamber at a constant level, valve means for controlling the flow of fuel from said chamber to said burner, means controlled by a device responsive to a controlling condition for automatically moving said valve means between a minimum flow position and a full open position depending upon the value of said condition, means operative upon the fuel rising in said chamber to an abnormal level to cause said valve means to close completely, to cause deenergization of said draft controlling means, and to prevent said valve means from initially reopening beyond said minimum flow position.

17. In a valve mechanism, valve means biased to closed position, electric motor means tending to cause opening of said valve means, thermal motor means opposing when cold the opening movement of said valve means, means including a device responsive to a first condition for controlling the heating of said thermal motor means to control the position to which said valve means may be opened, and means responsive to a second independent condition operative upon said second condition assuming a predetermined value to cause the deenergization of said electric motor means and to prevent the heating of said thermal motor means.

18. In a valve mechanism, valve means biased to closed position, electric motor means tending to cause opening of said valve means, thermal motor means opposing when cold the opening movement of said valve means, means including a device responsive to a first condition for controlling the heating of said thermal motor means to control the position to which said valve means may be opened, and means responsive to a second independent condition for causing the deenergization of said electric motor means upon said second condition assuming a predetermined value.

ASHLEY C. BENNETT.

REFERENCES CITED

The following references are of record in the file of this patent:

UNITED STATES PATENTS

| Number | Name | Date |
| --- | --- | --- |
| Re. 21,286 | Foulds | Dec. 5, 1939 |
| 1,107,748 | Becker | Aug. 18, 1914 |
| 1,410,909 | Garvey | Mar. 28, 1922 |
| 1,469,346 | Westall | Oct. 2, 1923 |
| 1,550,047 | Remnsnider | Aug. 18, 1925 |
| 1,556,817 | Higgins | Oct. 13, 1925 |
| 1,600,568 | Smith | Sept. 21, 1926 |
| 1,760,007 | Schaller | May 27, 1930 |
| 1,782,049 | Powers | Nov. 18, 1930 |
| 1,820,774 | Boyce | Aug. 25, 1931 |
| 1,821,769 | Resek | Sept. 1, 1931 |
| 1,858,557 | Piatt | May 17, 1932 |
| 2,068,138 | Johnson | Jan. 19, 1937 |
| 2,129,937 | Johnson | Sept. 13, 1938 |
| 2,183,815 | Johnson | Dec. 19, 1939 |
| 2,187,045 | McCorkle | Jan. 16, 1940 |
| 2,199,538 | Curry | May 7, 1940 |
| 2,236,559 | Anderson | Apr. 1, 1941 |
| 2,244,088 | Stroud | June 3, 1941 |
| 2,247,679 | Focke | July 1, 1941 |
| 2,267,187 | Bock | Dec. 23, 1941 |
| 2,329,292 | Perry | Sept. 14, 1943 |